United States Patent
Tsai (10) Patent No.: US 10,637,389 B2
(45) Date of Patent: Apr. 28, 2020

(54) MOTOR DRIVING CIRCUIT AND MOTOR DRIVING METHOD THEREOF

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/160,149

(22) Filed: Oct. 15, 2018

(65) Prior Publication Data

US 2020/0021230 A1 Jan. 16, 2020

(30) Foreign Application Priority Data

Jul. 13, 2018 (TW) ................. 107124276 A (51) Int. Cl.
*H02P 29/024* (2016.01)
*H02P 29/00* (2016.01)

(52) U.S. Cl.
CPC .................... *H02P 29/00* (2013.01)

(58) Field of Classification Search
CPC ....................................................... H02P 29/00
See application file for complete search history.

(56) References Cited

U.S. PATENT DOCUMENTS

2014/0176027 A1\* 6/2014 Osaki ................ H02P 27/08
318/400.2

FOREIGN PATENT DOCUMENTS

CN 201261211 Y 6/2009

\* cited by examiner

*Primary Examiner* — Cortez M Cook
(74) *Attorney, Agent, or Firm* — Li & Cai Intellectual Property (USA) Office (57) ABSTRACT

A motor driving circuit according to the present disclosure includes a driving voltage generation circuit, a duty detection circuit, a calibration circuit and a multiplier. The calibration circuit is coupled to the duty detection circuit and the multiplier is coupled to the driving voltage generation circuit and the calibration circuit. A motor driving method according to the present disclosure includes: detecting a duty cycle signal provided by a system terminal through the duty detection circuit; generating an adjustment signal according to the duty cycle signal through the calibration circuit; and multiplying the predetermined driving voltage by the adjustment signal through the multiplier to generate a driving voltage to a motor. The waveform of the coil current of the motor will be a sine wave. The adjustment signal represents a ratio at which the predetermined driving voltage needs to be adjusted under a specific duty of the motor.

8 Claims, 5 Drawing Sheets

MOTOR DRIVING CIRCUIT AND MOTOR DRIVING METHOD THEREOF

CROSS-REFERENCE TO RELATED PATENT APPLICATION

This application claims the benefit of priority to Taiwan Patent Application No. 107124276, filed on Jul. 13, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor driving circuit and a motor driving method, and more particularly to a motor driving circuit and a motor driving method make a waveform of a coil current of the motor substantially match the shape of an ideal sine wave at different motor speeds.

BACKGROUND OF THE DISCLOSURE

According to a rotor magnetic strip of a motor with different magnetizing shapes and a waveform of a back electromotive force generated from a coil of the motor in a magnetic field, some coil currents of the motors are suitable for square waves, and some are suitable for sine waves. Moreover, some of the motors need to have extra switching controls to cooperate with inductance characteristics of the coils.

Generally, a conduction of a driving force of a motor driven by sine wave voltage is smoother, and lower vibration noise. In practice, for the motor with coil currents suitable for sine waves, circuit design engineers usually adjust the waveform of a three-phase driving voltage provided to the motor from a sine wave to a sine wave with a double-peaked waveform (i.e. discontinuous PWM (DPWM) waveform).

However, due to the influences of some other factors, such as non-ideal characteristics of circuit components, even if the waveform of the three-phase driving voltage of the motor is adjusted to the double-peaked sine wave from the sine wave, the coil current of the motor still cannot match the shape of the ideal waveform of the sine wave. The aforementioned situation is especially obvious when the motor operates at low speed.

SUMMARY OF THE DISCLOSURE

In response to the above-referenced technical inadequacies, the present disclosure provides a motor driving circuit and a motor driving method in the present disclosure to make the waveform of the coil current of the motor substantially match the shape of an ideal sine wave.

In one aspect, the present disclosure provides a motor driving circuit configured to provide a driving voltage to drive a motor and the motor driving circuit includes a driving voltage generation circuit, a duty detection circuit, a calibration circuit and a multiplier. The driving voltage generation circuit is configured to provide a predetermined driving voltage. The duty detection circuit is configured to detect a duty cycle signal provided by a system terminal so as to generate duty information. The calibration circuit is coupled to the duty detection circuit and configured to generate an adjustment signal in accordance with the duty information. The multiplier is coupled to the driving voltage generation circuit and the duty detection circuit, and configured to multiply the predetermined driving voltage by the adjustment signal to generate the driving voltage so as to make a waveform of a coil current of the motor a sine wave. The adjustment signal represents a ratio at which the predetermined driving voltage needs to be adjusted under a specific duty of the motor.

In the motor driving circuit provided in the embodiment of the present disclosure, the waveform of the adjustment signal is determined by a plurality of nodes. At the same time, the calibration circuit correspondingly stores a plurality of numerical graphs, and each of the numerical graphs correspondingly stores a respective value of the node at different duties In one aspect, the present disclosure provides a motor driving method for controlling the motor driving circuit to provide a driving voltage to drive a motor, and the motor driving method includes steps of: providing a predetermined driving voltage through the driving voltage generation circuit; detecting a duty cycle signal provided by a system terminal through the duty detection circuit to generate duty information; generating an adjustment signal according to the duty cycle signal through the calibration circuit; and multiplexing the predetermined driving voltage by the adjustment signal through the multiplier to generate and provide a driving voltage to the motor to make a waveform of a coil current of the motor a sine wave. The adjustment signal represents a ratio at which the predetermined driving voltage needs to be adjusted under a specific duty of the motor.

Accordingly, a main feature of the motor driving circuit and the motor driving method provided in the present disclosure is to automatically provide a three-phase driving voltage for adjusting the motor at different motor speeds. Therefore, even if other influential factors (such as the non-ideal characteristics of the circuit) exist, the waveform of the coil current of the motor can still match the shape of the ideal sine wave.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

One Embodiment of Motor Driving Circuit

Figure 1:
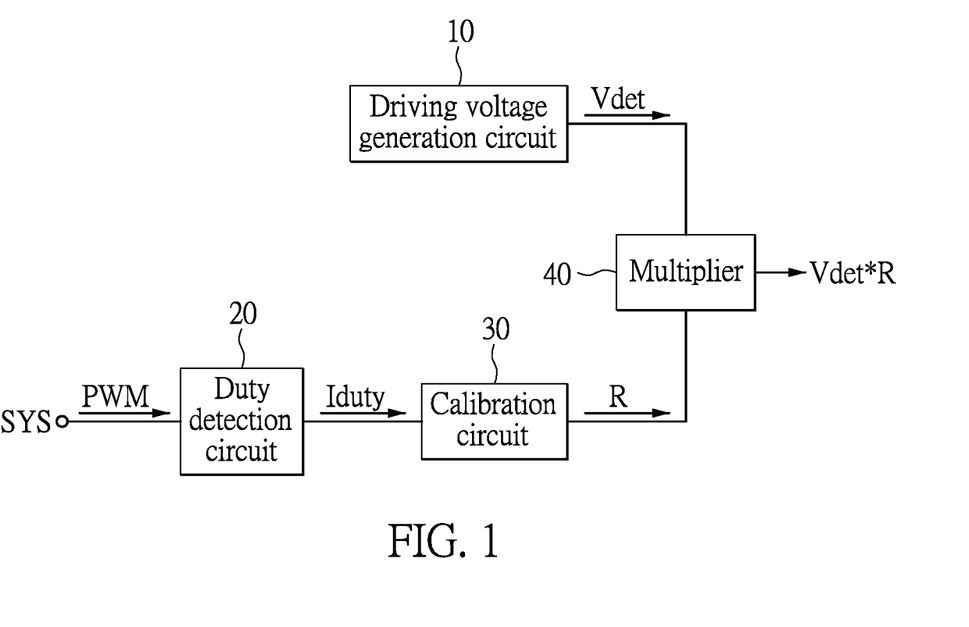
FIG. 1 is a block diagram illustrating a motor driving circuit according to an embodiment of the present disclosure.

Referring to FIG. 1, FIG. 1 is a block diagram of a motor driving circuit according to an embodiment of the present disclosure. As shown in FIG. 1, the motor driving circuit provided in the embodiment includes a driving voltage generation circuit 10, a duty detection circuit 20, a calibration circuit 30 and a multiplier 40. The duty detection circuit 20 is coupled to the calibration circuit 30, and the multiplier 40 is coupled to the driving voltage generation circuit 10 and the calibration circuit 30.

The driving voltage generation circuit 10 is configured to provide a predetermined driving voltage Vdet for the motor. The duty detection circuit 20 is configured to detect a duty cycle signal PWM provided by a system terminal SYS. Since the duty cycle signal PWM is used to determine a duty of the motor, the duty detection circuit 20 is able to receive the duty of the motor determined by the system terminal SYS according to the duty cycle signal PWM. Accordingly, the duty detection circuit 20 will generate duty information Iduty representing the duty of the motor. The main working principle of the motor driving circuit in the embodiment is that the calibration circuit 30 will generate an adjustment signal R according to the duty information Iduty after the duty detection circuit 20 receives the duty information Iduty, which represents the duty of the motor. Thereafter, the predetermined driving voltage Vdet is multiplied by the adjustment signal R through the multiplier 40 to generate a driving voltage for the motor.

The calibration circuit 30 can acquire a ratio at which the predetermined driving voltage Vdet needs to be adjusted according to the adjustment signal R generated by the duty information when the motor is under a specific duty. In other words, the predetermined driving voltage Vdet is adjusted by being multiplied by the adjustment signal R. It should be noted that, in the embodiment, the adjusted predetermined driving voltage Vdet is provided for the motor to make the waveform of the coil current of the motor match the shape of the ideal sine wave.

In the following description, details on the generation of the adjustment signal R by the calibration circuit 30 according to the duty information Iduty will be further described.

Figure 2A:
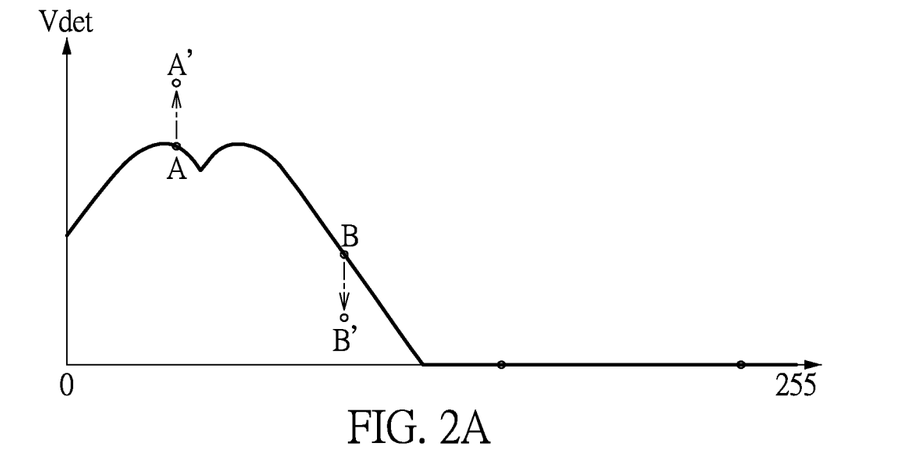
FIG. 2A is a schematic view illustrating a driving voltage in the embodiment of the present disclosure.

Referring to FIG. 2A, FIG. 2A is a schematic view of the predetermined driving voltage in the embodiment of the present disclosure. As shown in FIG. 2A, considering the equivalent circuit properties of the coil of the motor, the predetermined driving voltage Vdet generated by the driving voltage generation circuit 10 is designed to have a waveform with a double-peaked shape. For ease of illustration, a resolution of the waveform of the predetermined driving voltage Vdet in FIG. 2A is designed to be 8 bits (i.e., the waveform of the predetermined driving voltage Vdet is formed by 256 dots), but it is not limited herein.

Figure 2B:
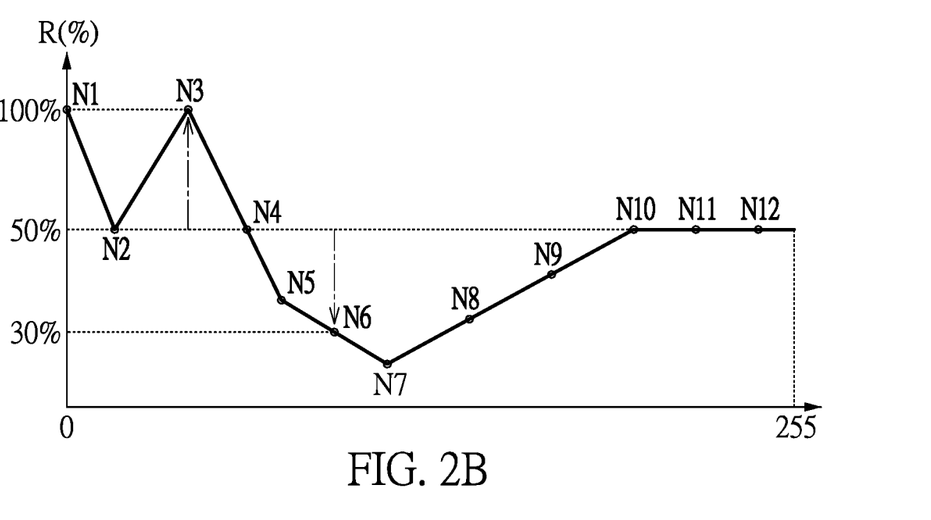
FIG. 2B is a schematic view illustrating an adjustment signal in the embodiment of the present disclosure.

Referring to FIG. 2B, FIG. 2B is a schematic view of the adjustment signal in the embodiment of the present disclosure. In the embodiment, the waveform of the adjustment signal R is determined by a plurality of nodes N1-N12, and each of the nodes N1-N12 corresponds to one of the dots in the waveform of the predetermined driving voltage Vdet at FIG. 2A. For example, in FIG. 2A and FIG. 2B, the node N3 in the waveform of the adjustment signal R corresponds to a dot A in the waveform of the predetermined driving voltage Vdet, and the node N6 in the waveform of the adjustment signal R corresponds to the dot B in the waveform of the predetermined driving voltage Vdet.

FIG. 2B is a schematic view illustrating an adjustment signal representing a ratio at which the predetermined driving voltage needs to be adjusted when the motor is under a specific duty. In order for the coil current of the motor to present the ideal sine wave, the predetermined driving voltage Vdet provided for the motor will be adjusted. Reference is made concurrently to FIG. 2A and FIG. 2B to facilitate understanding of the following description. The initial value for each of the nodes N1-N12 is 50% in the waveform of the adjustment signal R. When the coil current of the motor is too low so that the waveform thereof deviates from the ideal sine wave, the time point of the ideal sine wave corresponds to the dot A in the waveform of the predetermined driving voltage Vdet, the adjustment signal R (the ratio at which the predetermined driving voltage Vdet needs to be adjusted) will be increased (as shown in FIG. 2B, the value of the node N3 is increased from 50% to be 100%), and the predetermined driving voltage is equivalently increased due to the predetermined driving voltage being multiplied by the adjustment signal R (as shown in FIG. 2A, the dot A in the waveform of the predetermined driving voltage Vdet is moved up to be the dot A'). In contrast, when the coil current of the motor is too high so that the waveform thereof deviates from the ideal sine wave, the time point of the ideal sine wave corresponds to the dot B in the waveform of the predetermined driving voltage Vdet, the adjustment signal R (i.e., the ratio at which the predetermined driving voltage Vdet needs to be adjusted) will be decreased (as shown in FIG. 2B, the value of the node N6 is decreased from 50% to be 30%), and the predetermined driving voltage is equivalently decreased due to the predetermined driving voltage is multiplied by the adjustment signal R (as shown in FIG. 2A, the dot B in the waveform of the predetermined driving voltage Vdet is moved up to be the dot B').

Figure 3A:
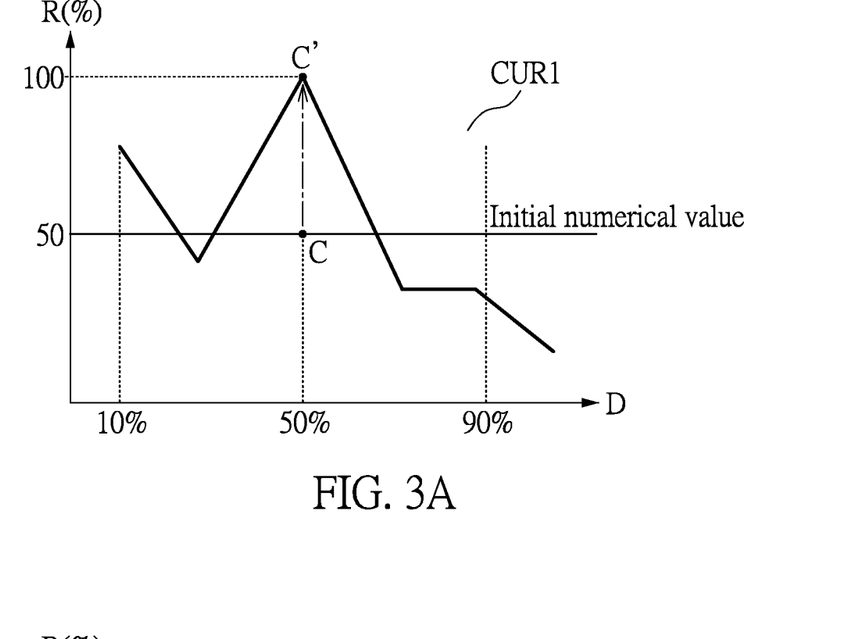
FIG. 3A and FIG. 3B are schematic views illustrating numerical graphs in the embodiment of the present disclosure.
Figure 3B:
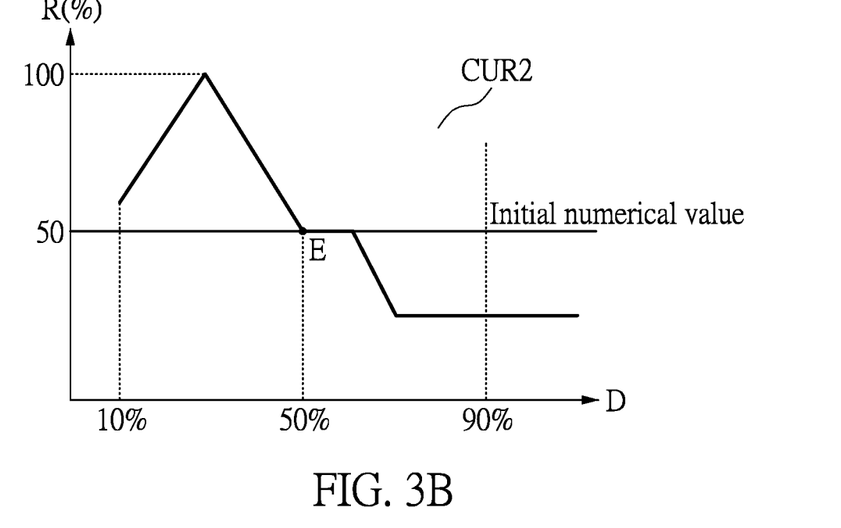

Referring to FIG. 3A and FIG. 3B, FIG. 3A is a schematic view of a numerical graph in the embodiment of the present disclosure.

In the embodiment, the calibration circuit 30 stores the numerical graphs CUR1 and CUR 2 shown in FIG. 3A and FIG. 3B. Specifically, each of the numerical graphs corresponds to one of the nodes in the waveform of the adjustment signal R. In the aforementioned example, if the waveform of the adjustment signal R is determined by the twelve nodes N1-N12, the calibration circuit 30 will store twelve numerical graphs. For example, the numerical graphs are represented as the numerical graphs CUR1 and CUR2 shown in FIG. 3A and FIG. 3B, but the number of the nodes in the waveform of the adjustment signal R (equal to the number of the numerical graphs stored in the calibration circuit 30) is not limited in the present disclosure.

In FIG. 3A, the numerical graph CUR1 corresponds to the node N1 in the waveform of the adjustment signal R, and the numerical graph CUR2 corresponds to the master node N2 in the waveform of the adjustment signal R. Furthermore, each of the numerical graphs, such as the numerical graphs CUR1 and CUR2, records the values of the corresponding nodes, such as nodes N1 and N2, set at different duties D of the motor. For example, the numerical graph CUR1 in FIG. 3A corresponds to the node N1 in the waveform of the adjustment signal R in FIG. 2B, and the numerical graph CUR1 records the values of the node N1 that are set when the motor is at the different duties D, such as at duty cycles of 10%, 50%, 90% and so on.

The calibration circuit 30 will acquire the duty D of the motor according to the duty information Iduty generated by the duty detection circuit 20. Therefore, according to the duty D of the motor, the calibration circuit 30 can acquire each of the values of the nodes by implementing each of the numerical graphs to generate the adjustment signal R. For example, when the duty cycle of the motor is 50%, the calibration circuit 30 can acquire that the value of the node N1 is set as 100% through the numerical graph CUR1, and the value of the node N2 is set as 50% through the numerical graph CUR2. After acquiring each of the values of the nodes at the waveform of the adjustment signal R in one of the duties D of the motor, the calibration circuit 30 can generate the adjustment signal R in one of the duties D of the motor according to the values.

It should be noted that, in the embodiment, the initial value for each of the nodes at different duties D can be set as 50% for practical operation when designing each of the numerical graphs for each node. Thereafter, the value 50% for each of the nodes at different duties D is increased or decreased according to the coil current of the motor at different duties D. Furthermore, taking the numerical graph CUR1 as an example, the value of the node N1 is adjusted from 50% to 100% when the duty cycle of the motor is 50% (i.e., a sub-node C is moved up to a sub-node C' in the numerical graph CUR1 of FIG. 3A), which indicates that the value of the node N1 corresponding to the waveform of the predetermined driving voltage is doubled to increase the coil current of the motor when the duty cycle of the motor is 50%. Taking the numerical graph CUR2 as an example, the value of the node N2 is set as the initial value 50% when the duty cycle of the motor is 50% (i.e., a sub-node E is maintained at the same position in the numerical graph CUR2 of FIG. 3B), and which indicates that the value of the node N2 corresponding to the waveform of the predetermined driving voltage is not required to be increased or decreased when the duty cycle of the motor is 50%. However, the initial value for each of the nodes is not limited in the present disclosure when designing the numerical graphs.

It should be noted that, in the embodiment, the resolution of the waveform of the adjustment signal R is equal to the resolution of the waveform of the predetermined driving voltage. It is assumed that when the resolution of the waveform of the predetermined driving voltage in FIG. 2A is set to be 8 bits (i.e., the waveform of the predetermined driving voltage can be formed by connecting 256 dots), the resolution of the waveform of the adjustment signal R is also designed to be 8 bits (i.e., the waveform of the adjustment signal can be formed by connecting 256 dots). In other words, when the resolution of the waveform of the predetermined driving voltage is set to be 8 bits in FIG. 2, the calibration circuit will be designed to generate the adjustment signal in accordance with the values of the 256 dots. In the previous example, the 256 dots include 12 nodes N1-N12 and the 244 sub-nodes between the nodes N1-N12. When the calibration circuit 30 generates the adjustment signal R according to the values set for each of the nodes, an interpolation method is used to calculate the values of the 244 sub-nodes. When the values of the nodes N1-N12 are found in accordance with the numerical graphs CUR1-CUR12 and the values of the 244 sub-nodes between the nodes N1-N12 are calculated by the interpolation method, and the calibration circuit 30 will generate the adjustment signal R according to the values of the nodes N1-N12 and the values of the sub-nodes.

In fact, it should be noted that the values for each of the dots in the waveform of the predetermined driving voltage can be increased or decreased according to a predetermined look-up table to adjust the predetermined driving voltage so as to modify the coil current of the motor. However, the aforementioned method requires a device with a huge storage to store a large amount of the look-up tables. Moreover, as in the description above, since the waveform of the predetermined driving voltage provided by the driving voltage generation circuit 10 is the non-linear double-peaked waveform, if the values for each of the dots at the waveform of the predetermined driving voltage are directly increased or decreased, the original non-linear waveform of the predetermined driving voltage will be compromised. Therefore, in the embodiment, without using the aforementioned method, a multiplier 40 is used to multiply the predetermined driving voltage by the adjustment signal R so as to adjust the predetermined driving voltage. Since the values for each of the dots in the waveform of the adjustment signal R is a ratio, if the values for each of the dots in the waveform of the predetermined driving voltage are multiplied by a ratio, the original non-linear waveform of the predetermined driving voltage will not be compromised. In other words, the motor driving circuit provided in the present disclosure implements the multiplier 40 to multiply the predetermined voltage by the adjustment signal R so as to adjust the predetermined driving voltage, and the non-linear waveform of the predetermined driving voltage can be maintained.

Figure 4A:
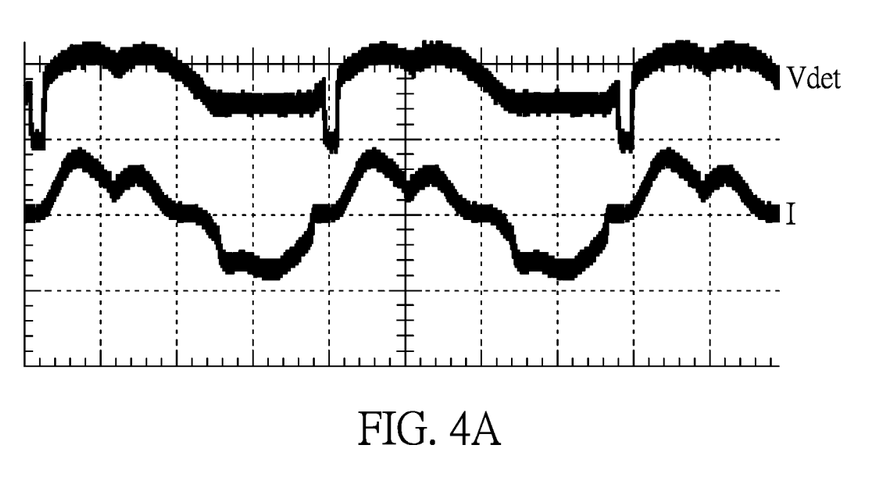
FIG. 4A and FIG. 4B are respectively a waveform simulation result of a coil current of the motor when a conventional motor driving circuit is operated and a waveform simulation result of the coil current of the motor when the motor driving circuit according to the embodiment of the present disclosure is operated.
Figure 4B:
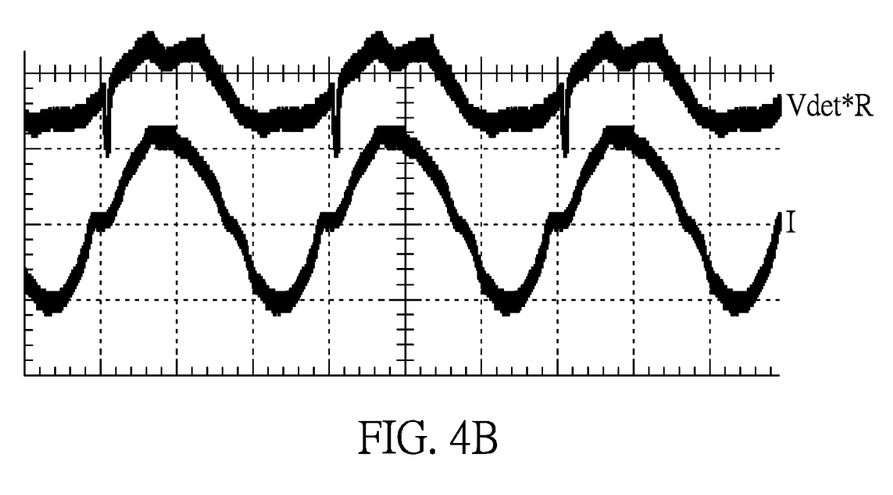

Referring to FIG. 4A and FIG. 4B, FIG. 4A and FIG. 4B are views respectively illustrating a waveform simulation result of the coil current when the conventional motor driving circuit is operated and a waveform simulation result of the coil current when the motor driving circuit provided in the embodiment of the present disclosure is operated.

As shown in FIG. 4A, the conventional motor driving circuit is operated and the motor is driven by sine wave voltage. Even if the waveform of the coil current is adjusted from the sine wave to be the sine wave with a double-peaked shape, other factors that may affect the performance of the motor may be present, e.g., the ideal sine wave failing to be exhibited by the coil current I of the motor due to the non-ideal characteristics of the circuit. Alternatively, in the embodiment, the calibration circuit 30 will provide different adjustment signals R to adjust the predetermined driving voltage Vdet in accordance with the different duties of the motor. When the coil current I of the motor is too low so that the waveform thereof deviates from the ideal sine wave, the adjustment signal R generated by the calibration circuit 30 will increase the predetermined driving voltage Vdet for the motor. In addition, when the coil current I of the motor is too high so that the waveform thereof deviates from the ideal sine wave, the adjustment signal R generated by the calibration circuit 30 will decrease the predetermined driving voltage Vdet. Therefore, with reference to FIG. 4B, in operation of the driving circuit of the motor provided in the embodiment, even if the aforementioned factors still exist, the ideal sine wave can still be exhibited by the coil current I of the motor through the adjustment signal R generated by the calibration circuit 30.

One Embodiment of Motor Driving Method

Figure 5:
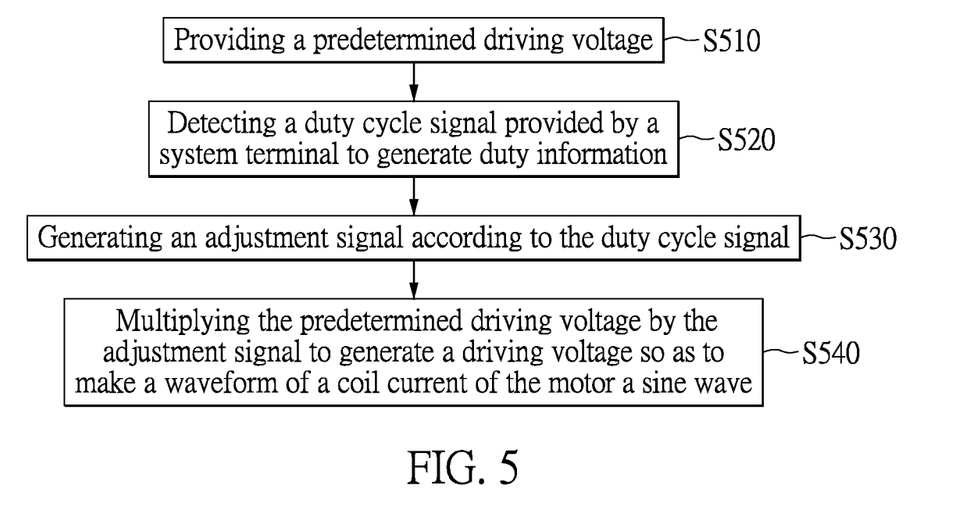
FIG. 5 is a flow chart illustrating a motor driving method according to an embodiment of the present disclosure.

FIG. 5 is a flow chart of a motor driving method in one embodiment of the present disclosure.

As shown in FIG. 5, the motor driving method provided in the present disclosure includes the following steps: step S510: providing a predetermined driving voltage; step S520: detecting a duty cycle signal provided by a system terminal to generate duty information; step S530: generating an adjustment signal according to the duty cycle signal; step S540: multiplying the predetermined driving voltage by the adjustment signal to generate a driving voltage so as to make a waveform of a coil current of the motor a sine wave.

The motor driving method provided in the embodiment is performed by the motor driving circuit shown in FIG. 1. Referring to FIG. 1 and FIG. 5, in step S510, the predetermined driving voltage is provided by the driving voltage generation circuit 10. In step S520, the duty cycle signal PWM provided by the system terminal SYS is detected through the duty detection circuit 20 to generate the duty information Iduty. Since the duty signal PWM is used to determine the duty of the motor, the duty detection circuit 20 acquires the duty of the motor determined by the system terminal SYS according to the duty signal PWM. Thereafter, in step S530, the adjustment signal R is generated by the calibration circuit 30 according to the duty information Iduty generated by the duty detection circuit 20. Finally, in step S540, the predetermined driving voltage Vdet is multiplied by the adjustment signal R through the multiplier 40 to generate the driving voltage (the predetermined driving voltage Vdet*the adjustment signal R).

According to the aforementioned description, in step S530, the adjustment signal R generated by the calibration circuit 30 according to the duty information Iduty represents a ratio at which the predetermined driving voltage Vdet needs to be adjusted when the motor is under a specific duty. Moreover, the driving voltage is generated in step S540 according to the predetermined driving voltage Vdet with the adjustment signal R generated by the calibration circuit 30, and the driving voltage is provided for the motor so as to make the waveform of the coil current of the motor substantially match the shape of the ideal sine wave.

Therefore, the motor driving method provided in the embodiment is able to control the motor driving circuit in the aforementioned embodiment to provide the driving voltage to drive the motor so as to make the waveform of the coil current of the motor match the shape of the ideal sine wave. It should be noted that since the motor driving method provided in the embodiment can be performed by the motor driving circuit of the present disclosure, other details for the motor driving method provided in the embodiment can be referred to in relevant descriptions of the motor driving circuit in the aforementioned embodiment and are omitted herein.

In conclusion, by operating the motor driving circuit and the motor driving method in the present disclosure, the corresponding adjustment signal can be provided when the motor is under full motor speed. Therefore, even other influential factors (such as the non-ideal characteristics of the circuit) exist, the waveform of the coil current of the motor can match the shape of the ideal sine wave when the motor is driven by the adjusted predetermined driving motor, so that the vibration noise of the motor can be within an ideal range.

In addition, the motor driving circuit and the motor driving method in the present disclosure implement the multiplier to multiply the predetermined driving voltage by the adjustment signal so as to adjust the predetermined driving voltage. Therefore, a nonlinearity of the predetermined driving voltage is maintained.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driving circuit configured to provide a driving voltage to drive a motor, comprising:
    a driving voltage generation circuit configured to provide a predetermined driving voltage;
    a duty detection circuit configured to detect a duty cycle signal provided by a system terminal so as to generate duty information;
    a calibration circuit coupled to the duty detection circuit and configured to generate an adjustment signal according to the duty information;
    a multiplier coupled to the driving voltage generation circuit and the duty detection circuit, and configured to multiply the predetermined driving voltage by the adjustment signal to generate the driving voltage so as to make a waveform of a coil current of the motor a sine wave;
    wherein the adjustment signal represents a ratio at which the predetermined driving voltage needs to be adjusted under a specific duty of the motor; and wherein a waveform of the adjustment signal is determined by a plurality of nodes and the calibration circuit correspondingly stores a plurality of numerical graphs and each of the numerical graphs records a numerical value for one of the corresponding nodes at different duties.

2. The motor driving circuit according to claim 1, wherein the duty information represents a duty of the motor and the calibration circuit implements the numerical graphs to determine a plurality of the numerical values of the nodes so as to generate the adjustment signal.

3. The motor driving circuit according to claim 2, wherein when the calibration circuit generates the adjustment signal, the numerical value for any one of sub-nodes between the nodes is determined by an interpolation method.

4. The motor driving circuit according to claim 3, wherein a resolution of the waveform of the adjustment signal is equal to the resolution of the waveform of the predetermined driving voltage.

5. A motor driving method for controlling a motor driving circuit to provide a driving voltage to drive a motor, the motor driving circuit including a driving voltage generation circuit, a duty detection circuit, a calibration circuit and a multiplier, the calibration circuit being connected to the duty detection circuit, the multiplier being connected to the driving voltage generation circuit and the calibration circuit, and the motor driving method comprising steps of:

providing a predetermined driving voltage through the driving voltage generation circuit;

detecting a duty cycle signal provided by a system terminal through the duty detection circuit to generate duty information;

generating an adjustment signal according to the duty cycle signal through the calibration circuit; and multiplexing the predetermined driving voltage by the adjustment signal through the multiplier to generate and provide a driving voltage to the motor so as to make a waveform of a coil current of the motor a sine wave;

wherein the adjustment signal represents a ratio at which the predetermined driving voltage needs to be adjusted under a specific duty of the motor; and wherein a waveform of the adjustment signal is determined by a plurality of nodes and the calibration circuit correspondingly stores a plurality of numerical graphs and each of the numerical graphs records a numerical value for one of the corresponding nodes at different duties.

6. The driving method according to claim 5, wherein the duty information represents a duty of the motor and the calibration circuit implements the numerical graphs to determine a plurality of the numerical values of the nodes so as to generate the adjustment signal.

7. The driving method according to claim 6, wherein when the calibration circuit generates the adjustment signal, the numerical value for any one of sub-nodes between the nodes is determined by an interpolation method.

8. The driving method according to claim 7, wherein a resolution of the waveform of the adjustment signal is equal to the resolution of the waveform of the predetermined driving voltage.

* * * * *